US006642322B2

(12) United States Patent
Gagné et al.

(10) Patent No.: US 6,642,322 B2
(45) Date of Patent: Nov. 4, 2003

(54) METHODS OF MAKING TELECHELIC OLIGOMERS, METHODS OF MAKING BLOCK COPOLYMERS, AND NOVEL BLOCK COPOLYMERS

(75) Inventors: Michel R. Gagné, Carrboro, NC (US); Michael R. Korn, Durham, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 36 days.

(21) Appl. No.: 09/965,939

(22) Filed: Sep. 27, 2001

(65) Prior Publication Data

US 2002/0115793 A1 Aug. 22, 2002

Related U.S. Application Data

(62) Division of application No. 09/234,622, filed on Jan. 21, 1999, now abandoned.
(60) Provisional application No. 60/072,078, filed on Jan. 21, 1998.

(51) Int. Cl.[7] .................. C08F 283/02; C08F 293/00; C08G 64/18
(52) U.S. Cl. .................. 525/411; 525/90; 525/91; 525/412; 525/445; 525/454; 525/455; 525/468; 528/57; 528/75; 528/196; 528/200; 528/358
(58) Field of Search .................. 525/90, 91, 411, 525/412, 445, 454, 455, 468; 528/57, 75, 196, 200, 358

(56) References Cited

U.S. PATENT DOCUMENTS

| 4,281,087 A | * | 7/1981 | Heuschen |  |
|---|---|---|---|---|
| 4,319,003 A | * | 3/1982 | Gardlund |  |
| 4,644,053 A |  | 2/1987 | Brunelle et al. | 528/371 |
| 4,831,001 A |  | 5/1989 | Evans |  |
| 4,888,401 A | * | 12/1989 | Kawaki |  |
| 5,071,921 A | * | 12/1991 | Eichenauer |  |
| 5,314,970 A | * | 5/1994 | MacLeay |  |
| 5,414,054 A |  | 5/1995 | Jonsson et al. | 525/439 |
| 5,414,057 A |  | 5/1995 | Campbell |  |
| 5,426,159 A | * | 6/1995 | Umemura |  |
| 5,637,655 A |  | 6/1997 | Priddy, Jr. et al. | 525/438 |
| 5,652,275 A |  | 7/1997 | Buysch et al. |  |

FOREIGN PATENT DOCUMENTS

| JP | 01-129011 | * 5/1989 |
| WO | WO 94/12572 | 6/1994 |
| WO | WO 95/31503 | 11/1995 |
| WO | WO 95/31504 | 11/1995 |
| WO | WO 97/18250 | 5/1997 |

OTHER PUBLICATIONS

V. Schnell et al.; *Über cyclische Carbonate aromatischer Dihydroxyverbindungen*, Mehrowel. Chem. 57, 1–11, 1962.
E. Goethals; *Review Table, Telechelic Polymers: Synthesis and Applications*; Goethals, E.J., Ed., CRC Press: Boca Raton, FL, 1989.
T. L. Evans et al.; *Fundamentals of Cyclic BPA Carbonate Oligomer Ring–Operating Polymerization*, Polym. Prepr. 30(2), 1989.
T. Evans et al.; *Use of Cyclic Carbonate Oligomers in the Synthesis of Bisphenol–A Polycarbonate–Polydimethylsiloxane Copolymers*, Makromol. Chem. Macromol Symp. 42/43:177–184 (1991).
H. Keul et al.; *Preparation of Polymers with Polycarbonate Sequences and Their Depolymerization; an Example of Thermodynamic Recycling*; Makromol. Chem., Macromol Symp. 67:289–298 (1993).
C. Hawker; *Molecular Weight Control by a "Living" Free–Radical Polymerization Process*, J. Am. Chem. Soc. 116:11185–11186 (1994).
P. Degee et al.; *Synthesis and characterization of halato–telechelic bisphenol–A polycarbonates*, Polymer 35:371 (1994).
C. Hawker et al.; *Accurate Control of Chain Ends by a Novel "Living" Free–Radical Polymerization Process*, Macromolecules 28:2993–2995 (1995).
I.Q. Li et al.; *Mono– and Dinitroxide Styrene Polymerization Initiators*, Macromolecules 29:8554–8555 (1996).
K. Beers et al.; *Graft/Comb Copolymers by Atom Transfer Radical Polymerization Hydrogels*, Polymer Prepr. 38(1), 1997.
D. Benoit et al.; *Controlled Free—Radical Polymerization in the Presence of a Novel Asymmetric Nitroxyl Radical*, Polymer Prepr. 38(1), 1997.
D. Betts et al.; *Controlled Radical Polymerization methods for the Synthesis of Non–Ionic Surfactants for $CO_2$*, Polymer Prepr. 38(1), 1997.
S. Coca et al.; *Block Copolymers by Transformation of "Living" Carbocationic into "Living" Radical Polymerization*, Polymr. Prepr. 38(1), 1997.
L. Gabaston et al.; *Synthesis of Water Soluble Homopolymers and Block Copolymers by Living Free–Radical polymerisation*, Polymer Prepr. 38(1), 1997.
S. Gaynor, et al.; *From Step Growth to "Living" Free Radical Polymerization: The Synthesis of ABA Block Copolymers of Vinyl and Step Growth Polymers by ATRP*, Polymer Prepr. 38(1), 1997.
K. Matyjaszewski; *Atom Transfer Radical Polymerization. Role of Various Components and Reaction Conditions*, Polym. Prepr. 38(1), 1997.
V. Percec et al.; *Metal Catalyzed "Living" Radical Polymerization Initiated with Sulfonyl Halides*, Polym. Prepr. 38(1), 1997.

(List continued on next page.)

Primary Examiner—David J. Buttner
(74) Attorney, Agent, or Firm—Myers Bigel Sibley & Sajovec

(57) ABSTRACT

A method of making telechelic oligomers comprises reacting a substrate compound selected from the group consisting of relatively high molecular weight polymers with a chain transfer agent in the presence of an alkali metal catalyst. The telechelic oligomers thus produced may then be reacted with monomers according to known polymerization techniques in order to produce block copolymers.

5 Claims, 1 Drawing Sheet

OTHER PUBLICATIONS

D. Sogah et al.; *Design and Synthesis of New Nitroxides and their Application in Living Polymerizations*, Polym. Prepr. 38(1), 1997.

Y. Zhu et al.; *Nitroxide Initiated/Mediated Polymerization of Styrene: Analysis of End–Groups*; Polym. Prepr. 38(1), 1997.

D. Brunelle et al.; *Semi–crystalline Polymers via Ring–opening Polymerization: Preparation and Polymerization of Alkylene Phthalate Cyclic Oligomers*, Polym. Prepr. 38(2), 1997.

C. Hawker et al.; *Versatile Synthesis of Block Copolymers by Solvent–Free "Living" Radical Procedures: Functionalized Unimolecular and Polymeric Initiators*, Polym. Prepr. 38(2):412–413 (1997).

N. Listigovers et al.; *Synthesis of Diblock Copolymers via a "Living" Stable Free Radical Bulk Polymerization and Conversion to Functionalized Amphiphilic Materials*, Polym. Prepr. 38(2):410–411 (1997).

K. Matyjaszewski; *Bulk Atom Transfer Radical Polymerization*, Polym. Prepr. 38(2):383–384 (1997).

M. Watson et al.; *One–Pot Homogenous Metathesis/Heterogeneous Hydrogenation Chemistry in the Synthesis of Saturated Polymers and Small Molecules*, Polym. Prepr. 38(2):474–474 (1997).

B. Améduri et al.; *Synthesis of Block Copolymers by Radical Polymerization and Telomerization*, Advances in Polymer Science, 127:90–103 (1997).

V. Balsamo et al.; *Ellipsoidal Core–Shell Cylindrical Microphases in PS–b–PB–b–PCL Triblock Copolymers with a Crystallizable Matrix*, Makromol. Chem. Symp 117:153–165 (1997).

M. Baumert et al.; *Carboxy–terminated homo– and copolymers of styrene using dicarboxylic acid–functional azo initiator and 2,2,6,6–tetramethyl–1–piperdyloxyl (TEMPO)*, Macromol Rapid Commun. 18:787–794 (1997).

C. Hawker; *"Living" Free Radical Polymerization: A Unique Technique for the Preparation of Controlled Macromolecular Architectures*, Acc. Chem. Res. 30:373–382 (1997).

I.Q. Li et al.; *Block Copolymer Preparation Using Sequential Normal/Living Radical Polymerization Techniques*, Macrmolecules 30:5195–5199 (1997).

M. Marks et al.; *Synthesis and Thermochemistry of Phenylmaleimide– and Phenylnadimide–Terminated Bisphenol A Polycarbonates*, Journal of Polymer Science 35:385–390 (1997).

S. Sioula et al.; *Microphase Separation in Block CO– and Terpolymers of Novel Macromolecular Architectures*, Makromol. Chem. Macromol. Symp. 117:167–174 (1997).

W. Stevels et al.; *New Initiators for the Ring–opening Polymerization of Cyclic Esters*; Trends in Polymer Sci. 5, 300–305, 1997.

E. Yoshida et al.; *Living Radical Polymerization of Styrene by a Stable Nitroxyl Radical and Macroazoinitiator*, Macromolecules 30:4018–4023 (1997).

H. R. Kricheldorf et al.; *Macrocycles. 3. Telechelic Polylactones via Macrocyclic Polymerization*, Macromolecules 31, 614–620, 1998.

* cited by examiner

METHODS OF MAKING TELECHELIC OLIGOMERS, METHODS OF MAKING BLOCK COPOLYMERS, AND NOVEL BLOCK COPOLYMERS

RELATED APPLICATIONS

This application is a divisional application of Ser. No. 09/234,622 filed Jan. 21, 1999, now abandoned, which claims the benefit of U.S. Provisional Application Ser. No. 60/072,078, filed Jan. 21, 1998, the disclosures of which are incorporated herein in their entirety.

FIELD OF THE INVENTION

This invention relates to methods of making telechelic oligomers, methods of making block copolymers, and compounds useful in such methods.

BACKGROUND OF THE INVENTION

The development of methods for synthesizing telechelic oligomers is an increasingly important area of research, as these materials have useful properties and may serve, for example, as foundations for the synthesis of block copolymers. See generally, *Telechelic Polymers: Synthesis and Applications*, (E. J. Goethals, ed., (CRC Press, Boca Raton, Fla., 1989); V. Percec et al., *Macromonomers, Oligomers, and Telechelic Polymers in Comprehensive Polymer Science* 6, 282–357 (G. C. Eastmon et al., eds., Pergamon Press, New York, 1989). Whereas a number of telechelic oligomers based on vinyl monomers have been reported, few polycarbonate (PC) polycondensation telechelic oligomers are known, despite the industrial importance of polycarbonates such as bisphenol A polycarbonate. See, e.g., C. O. Mork et al., *J. Appl. Polym. Sci.* 45,2289–2301 (1992) and J. S. Riffle et al., *J. Polym. Sci., Polym. Chem. Div.,* 20, 2289–2301 (1982) (hydroxy-terminated telechelic PC); M. J. Marks et al., *J. Polym. Sci., Polym. Chem. Div.,* 35, 385–390 (1994) and M. J. Marks et al., Macromolecules 27, 4106–4113 (1994) (non-hydroxy terminated telechelic PCs).

Two general methods for the synthesis of telechelic polycondensates are known: (1) the use of a stoichiometric imbalance of difunctional monomers during polymerization, including the addition of monofunctional monomers; and (2) the depolymerization of polymers using reactive small molecules (e.g., glycolysis). See, *Polymeric Materials Encyclopedia*, 7412–7414, J. Salamone, ed., (CRC Press, Inc., Boca Raton Fla., 1996). The former method has successfully yielded the known telechelic PCs, while the second method has had only limited success in producing telechelic PCs. See C. H. Bailly, *J. Polym. Sci. (Polym. Phys. Div.)* 23, 493 (1985). Additionally, several examples have been reported for methods of breaking down high molecular weight polyesters (e.g., in methods of recycling) by adding a significant excess of alcohol or water to the polyester to gain the starting monomers (i.e., diacid, diol, their derivatives or low molecular weight adducts). Using similar methodology, polycarbonates may be recycled by adding water to yield a bisphenol. In general, a transesterification catalyst, heat and optionally a solvent is required for this method. Transesterification catalysts reported include acids, bases, and metal-organic compounds based on metals such as tin, titanium, magnesium, calcium, or zinc.

Telechelic oligomers may be used to carry out three important operations: (1) the formation of linear and branched long polymer chains by the chain extension of short polymer chains; (2) the formation of networks; and (3) the formation of block copolymers. See, e.g., *Polym. Prepr.* 38(2), 695 (1997). Block copolymers often have properties that are unavailable in homopolymers or in mixtures of homopolymers. Block copolymers may be useful in the formation of, e.g., thermoplastic elastomers (TPE), where materials contain "hard" and "soft" segments that phase-separate to give rise to elastomeric behavior. The "hard" segments act as reversible crosslinks during thermal treatment, such treatment causing a transition to the thermoplastic. Block copolymers are additionally useful in polymer compatibilization methods, where small amounts of block copolymers reduce surface energy and increase the surface adhesion of two normally imiscible polymer phases, resulting in blends with superior properties as compared to uncompatibilized, macrophase-separated polymers. Block copolymers may also serve as surfactants in various processes.

Two known methods for synthesizing block copolymers involve the utilization of living polymerization methodologies and telechelic oligomers. Living methods allow stable propagating end groups to insert a second monomer, thereby accessing AB-type blocks. In principle, this methodology should access many polymer types. However, the living technology is typically only accessible to chain-growth processes, thereby eliminating materials exclusively synthesized via step-growth-type mechanisms. Additionally, the kind of "B" monomers compatible with known "A" monomers is limited by the choice of "A" monomers.

An alternative method of synthesizing block copolymers involves the use of telechelic oligomers, which through the presence of reactive end groups allows new polymer chains to be grown or grafted. Polymers that are typically synthesized using step-growth type processes are amenable to this approach through the utilization of comonomers that effectively cap the growing polymer chain. However, few general methods have been reported for the synthesis of telechelic polyesters and polycarbonates using this approach. As a result, the properties of such important industrial polymers have not been widely expanded by their incorporation into well-defined block materials.

Accordingly, a need exists for general and convergent techniques for the construction of di- and multi-block polymers such as polyesters and polycarbonates. Such techniques would allow for the incorporation of numerous and functionally diverse reactive end groups into a wide variety of polyester and polycarbonate oligomers. Telechelic oligomers produced by such methods may serve as building blocks for the convergent construction of, for example, di- and triblock polyester and polycarbonate copolymers.

SUMMARY OF THE INVENTION

The present invention is based upon the discovery that high molecular weight polymers (e.g., polyesters and polycarbonates) may be broken down in the presence of a chain transfer agent (CTA) and catalytic amounts of alkali metal alkoxides, producing telechelic oligomers in a relatively short period of time. It has additionally been discovered that the ring-opening of cyclic esters in the presence of acyclic esters may yield ester-bearing telechelics, thus generally providing for 100% endgroup control.

Accordingly, one aspect of the invention is a method of making a telechelic oligomer, comprising reacting a substrate compound selected from the group consisting of polycarbonates, polyesters, polyurethanes, polyarylates, cyclic esters, cyclic carbonates, and cyclic urethanes with a chain transfer agent (CTA) in the presence of an alkali metal catalyst to form a telechelic oligomer. Telechelic oligomers produced by such a method may then be further reacted with monomers according to known polymerization methods in order to produce block copolymers. Another aspect of the invention is a method of producing a block copolymer comprising reacting a substrate compound as provided herein with a chain transfer agents comprising a polymeric residue in the presence of a catalyst as provided herein, thus producing a block copolymer. An alternative embodiment of this aspect of the invention comprises reacting a substrate compound comprising a polymeric residue with a chain transfer agent as provided herein, in the presence of a catalyst as provided herein, in order to yield a block copolymer. Additional aspects of the invention include telechelic oligomers and block copolymers prepared by methods of the present invention, as well as certain novel block copolymers.

These and other aspects of the invention are set forth in the detailed description of the invention below.

DETAILED DESCRIPTION OF THE INVENTION

Figure 1:
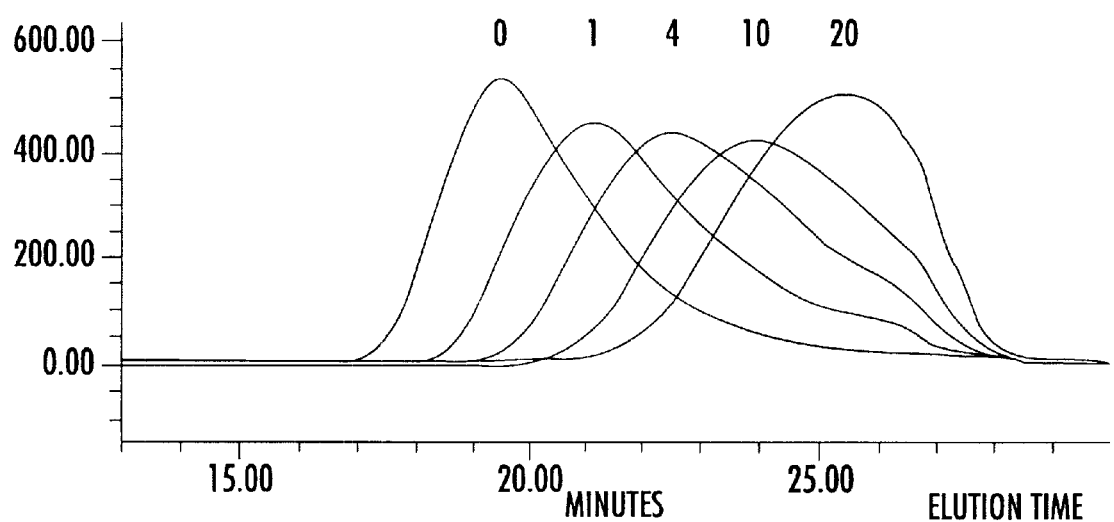
FIG. 1 is a graph of GPC curves of depolymerized commercial polycarbonates (Mn=22,000 PDI=2.2), produced according to the methods described in Example 1, below. The peak indicated as "0" is representative of the starting material (namely, entry number 1 in Table 1, below). The values on the X-axis represent elution time in minutes.

The present invention will now be described more fully hereinafter, in which preferred embodiments are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

A. Definitions and Starting Materials

1. General Definitions

The $pK_a$s provided herein are expressed as $pK_a$ in DMSO. The term "alkyl" is to be broadly interpreted and includes, but is not limited to, various linear, substituted, unsubstituted, branched, saturated, unsaturated, cyclic, and acyclic alkyls. Halogenated alkyls, preferably fluoroalkyls such as fluoroalkoxides, are also encompassed by this definition of alkyl. An ester is defined herein as a compound comprising at least one carbon, nitrogen, phosphorus, or sulfur atom, wherein said carbon, nitrogen, phosphorus or sulfur atom is double-bonded to oxygen or sulfur. For example, esters of the present invention include esters as classically defined (e.g., the products of reactions between carboxylic acids and alcohols), thioesters, carbonates, phosphonates and sulfates. Esters of the present invention include aromatic, aliphatic, cycloaliphatic, aliphatic-aromatic, olefinic, linear, branched, and substituted (e.g., with heteroatoms) esters, as well as oligomeric or polymeric esters.

As used herein, the terms "telechelic oligomer" and "telechelic polymer" are used interchangeably to mean a relatively low molecular weight polymer possessing at least one reactive functional group, and preferably at least two reactive functional groups, each situated at the terminal ends of the polymer. If the telechelic oligomer possesses more than one functional group, then the functional groups may be the same as each other, or may be different from each other. In general, telechelic oligomers of the present invention will have a molecular weight ($M_n$) of less than about 20,000 g/mol, preferably less than about 15,000 g/mol, and more preferably less than about 10,000 g/mol. When the reactive endgroups of the telechelic oligomer are identical, the telechelic oligomer is referred to herein as a "homotelechelic oligomer." When the reactive endgroups of the telechelic oligomer are different from each other, the telechelic oligomer is referred to herein as a "heterotelechelic oligomer." Telechelic polyesters, for example, may be classified as heterotelechelic oligomers.

Numerous polymers and monomers thereof are referred to herein by their well-known abbreviations and acronyms. As used herein, "PS" means polystyrene, "PC" means polycarbonate, "PECL" and "PCL" interchangeably mean poly($\epsilon$-caprolactone), "PMMA" means polymethyl methacrylate, "PLA" means poly(lactic acid), "PDMS" means polydimethylsiloxane, "PB" means polybutadiene, "PVA" means polyvinylalcohol, "PFOA" means fluorinated polyacrylate, "PEB" means poly(ethylene-butylene), and "SAN" means poly(styrene-acrylonitrile).

2. Substrate Compounds

As used herein, a "substrate compound" is a compound that may be decreased in molecular weight into at least one telechelic oligomer in the presence of a chain transfer agent and an alkali metal catalyst (as those terms are defined herein). Although Applicants do not wish to be bound to any particular theory of the invention, it is thought that substrate compounds of the present invention are broken down into telechelic oligomers in the presence of chain transfer agents via either an ester metathesis reaction or a ring-opening chain transfer polymerization reaction that is catalyzed by an alkali metal catalyst of the present invention. In one embodiment of the invention, the substrate compound is a high molecular weight polymer such as a polycarbonate, polyester, polyarylate, or polyurethane, in a range from about 10,000 g/mol to about 500,000 g/mol molecular weight ($M_n$). Examples of such substrate compounds include, but are not limited to, the polymers of acyclic esters, esterification products such as PET, PEN, and PBT, phosphorous-based esters, and thioesters. In one preferred embodiment of the present invention, the substrate compound is bisphenol A polycarbonate. Substrate compounds of the present invention also include cyclic esters (e.g., caprolactones), cyclic carbonates, and cyclic urethanes.

In addition to relatively high molecular weight polymer compounds as provided above, suitable substrate compounds of the present invention also include non-polymeric esterified pharmaceutical materials, and mixtures thereof. These substrate compounds generally have a molecular weight ($M_n$) ranging from about 50 g/mol to about 1000 g/mol. Exemplary pharmaceutical substrate materials include, for example, VX®, SARIN®, SOMAN®, and TABUN®.

3. Chain Transfer Agents

As used herein, a chain transfer agent (CTA) is a compound comprising at least one residue that may be incorporated into the terminal end of a polymer in the presence of an alkali metal catalyst, as defined herein. Preferably, chain transfer agents are esters in which the $pK_a$ of the corresponding alcohol is in the range of the $pK_a$ of the primary leaving group of the substrate compound to be depolymerized or broken down. For example, a CTA for breaking down a polycarbonate (PC) preferably has a $pK_a$ value that is close to the $pK_a$ for the phenolic residue of the polycarbonate. In a method of the present invention, the $pK_a$ of the CTA and the leaving group of the substrate to be broken down preferably differ from each other by a value of less than three $pK_a$ units, more preferably by a value of less than 1.5 $pK_a$ units, and are most preferably the same or about the same. Exemplary CTAs include low molecular weight ester/carbonates, diester/carbonates, or multi-ester/carbonates. CTAs may be aromatic, aliphatic, cycloaliphatic, mixed aliphatic-aromatic, linear, branched, substituted (e.g., with heteroatoms such as O, halogen (i.e., Br, Cl, F, I), Si, N, S, and P, with F being particularly preferred), saturated, or unsaturated, and may comprise oligomeric, or polymeric residues. Particularly preferred are CTAs which result in telechelic polycarbonates bearing endgroups that allow a subsequent reaction with olefinic monomers, resulting in polycondensate-polyolefin block copolymers. Numerous examples of CTAs of the present invention are provided herein. However, specific examples of CTAs disclosed herein are provided as illustration only, and are not by their disclosure intended to limit the scope of the CTAs that are useful in the practice of the present invention.

Preferred CTAs of the present invention include, but are not limited to, the aromatic CTAs of Scheme 1, and the aliphatic/aromatic and polymeric CTAs illustrated in Scheme 2.

It will be appreciated by one skilled in the art that several of the CTAs illustrated in Scheme 1 bear endgroups that allow subsequent reactions with olefinic monomers. For example, the diarylcarbonate and diarylester CTAs shown in the first column of Scheme 1 exemplify CTAs that will give rise to telechelic polycarbonates with end groups capable of initiating a "living/controlled" free radical polymerization of styrene, methyl methacrylate, and other monomers, thus resulting in polycondensate-polyolefin block copolymers. See, e.g., K. Mataszewski, *Polym. Prepr.* 38(2) 383–4 (1997). The three CTA's shown in the second column of Scheme 1 are similarly designed to incorporate protected nucleophilic functionalities ($NH_2$, OH, SH). The third column of Scheme 1 contains a protected benzaldehyde and silyl enolether CTA. Telechelic materials derived from these carbonates are useful in the "living" group transfer polymerization of methylacrylate and an aldol. The final CTA in Scheme 1 facilitates access to telechelic polycarbonates with long aliphatic or perfluoroether chains off the ends of the chain, yielding branched telechelics. Synthesis of these carbonates may be accomplished using a phenol compound and a phosgene source (e.g., triphosgene), or via an esterification reaction (Equation 1) or ester interchange reaction

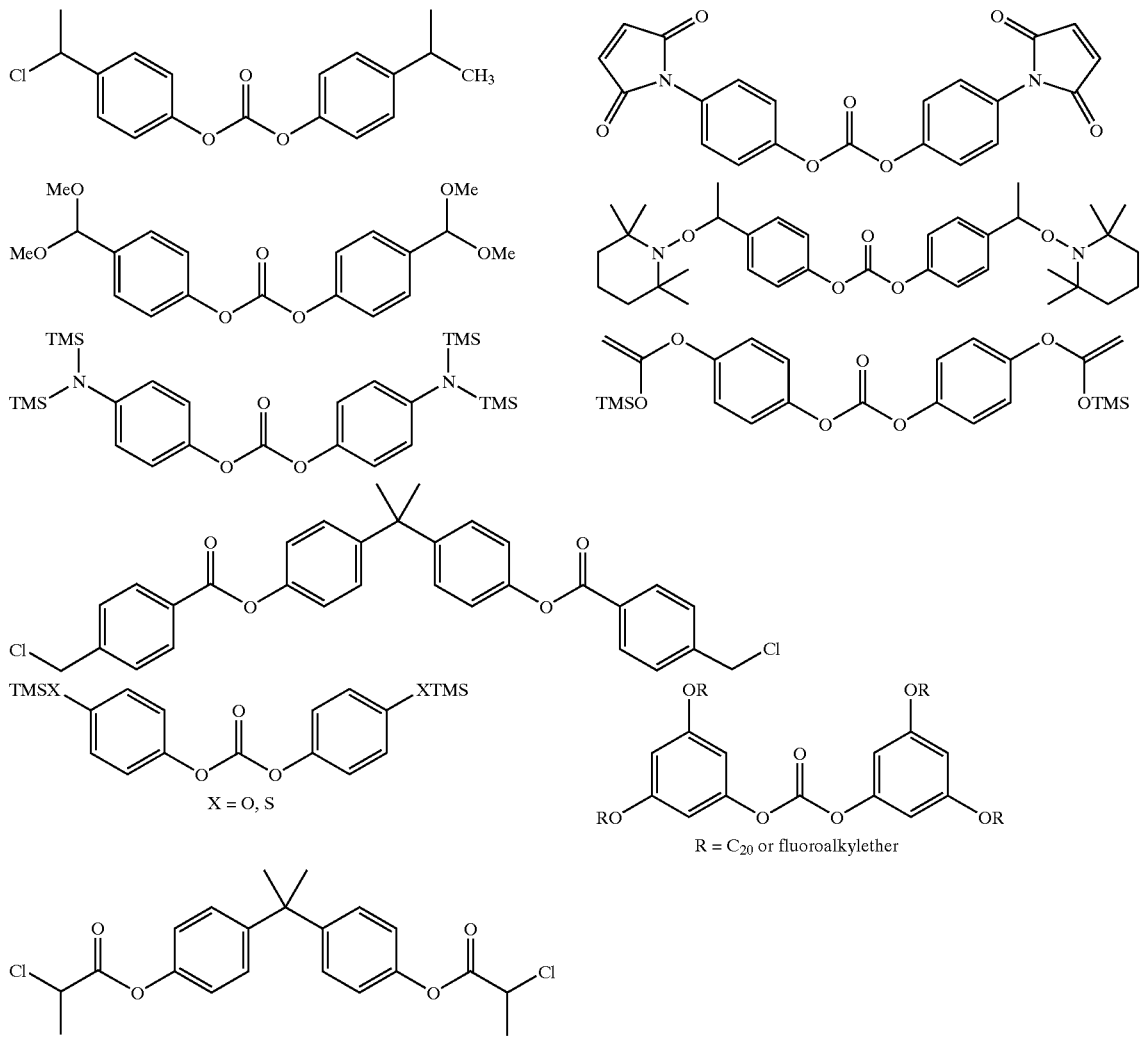

Scheme 1

Aromatic CTAs with the acetate of the phenol and diphenyl carbonate (Equation 2), shown below.

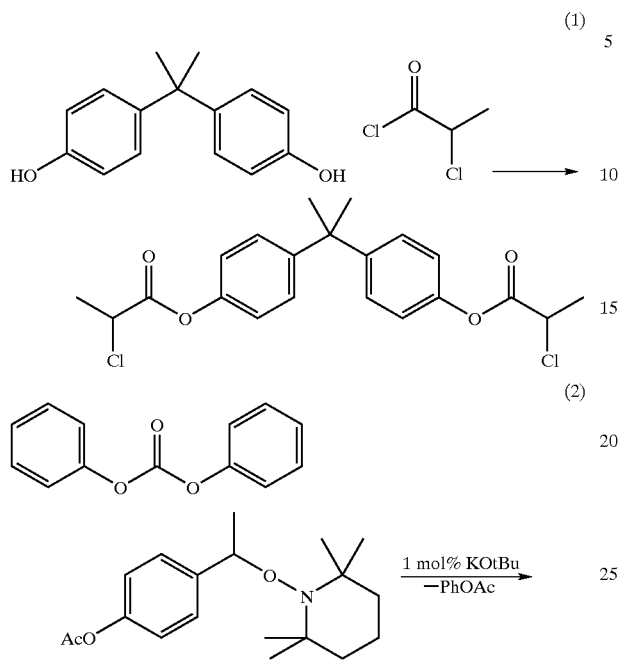

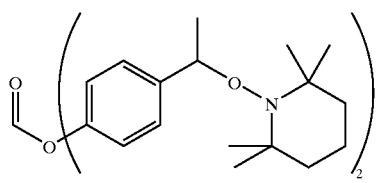

It is not always possible to carry out ester/carbonate metathesis reactions on aryl esters with alkyl esters, due to the vast leaving group differences in leaving group nucleophilicities. To circumvent this problem, CTAs comprising mixed aliphatic/aromatic carbonates utilizing a phenolic (e.g., a bis-phenol A) spacer, as shown in Scheme 2, may be used. Upon addition of an aryloxide nucleophile into the mixed carbonate, two good and one poor leaving group will result in the effective delivery of the aliphatic alkoxide to the terminus of each polymer chain, as illustrated in Scheme 3. Synthesis of these mixed carbonates is accomplished using the bischloroformates of the phenolic spacers, which are readily available.

Scheme 2
Aliphatic/Aromatic

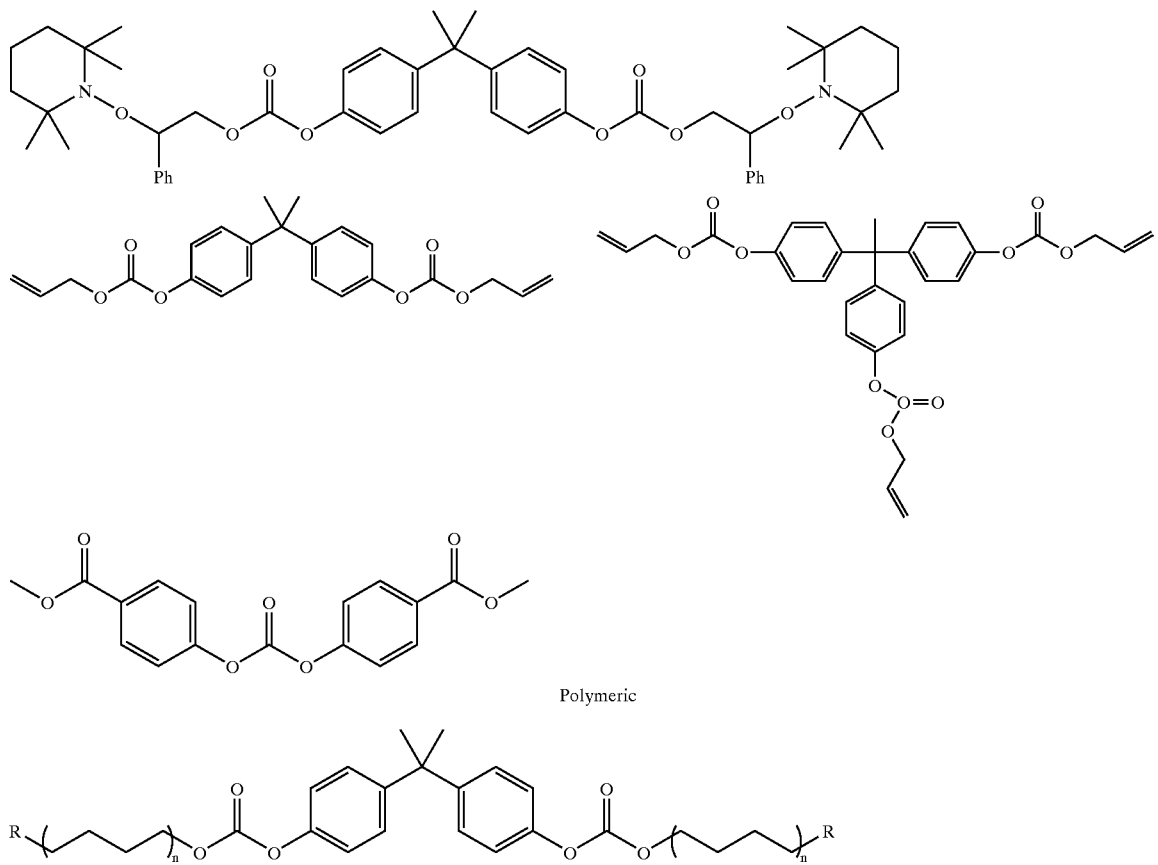

Polymeric

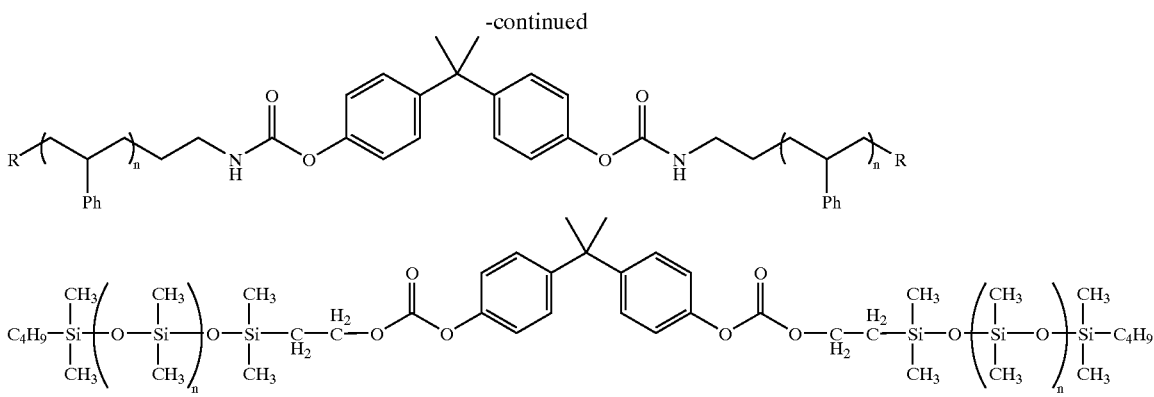

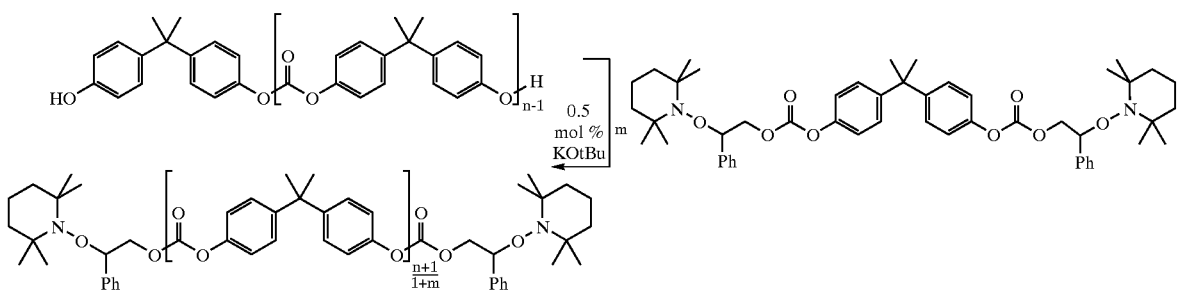

Scheme 3

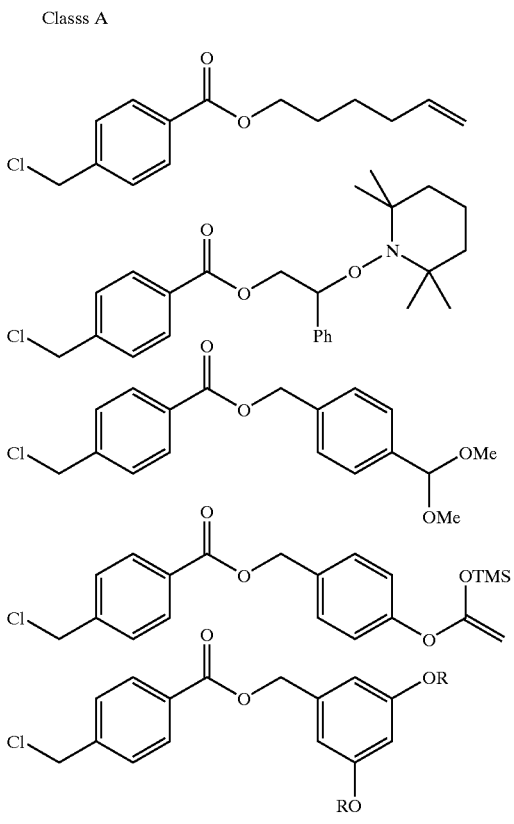

Polymeric carbonate CTA's of Scheme 2 are characterized as materials containing polymeric residues that transfer polymeric chains to the termini of telechelic oligomers. In the practice of the present invention, these materials lead directly to the production of ABA block copolymers, with a central polycarbonate block. When a trifunctional carbonate CTA is used (e.g., compound 14 herein), branched (i.e., non-linear) polymers may be produced.

In a method of the present invention in which the production of telechelic polyesters is desired, preferred CTAs include those illustrated below in Scheme 4.

These CTA's may be divided into three general classes. The A class of column 1 represents monoesters containing a halogen endgroup for initiating, for example, atom transfer free radical polymerization (ATRP), and a second functional group for derivitizing the alkoxy end of the polymer. The CTAs of this class are useful in, for example, in an ATRP method as described in K. Matyjaszewski, *Polym. Prepr.* 38(2) 383–4 (1997), for the introduction of PS/PMMA blocks on the acyl side of a growing polymer. The CTAs of this class are useful not only for their diversity but also for their stability in the presence of the basic polymerization conditions. The nitroxide end group allows, for example, PS, PMMA, and PB blocks to be grown while the acetal and silylenol ether groups access group transfer polymerization (GTP) and aldol GTP processes for growing chains. The final ester column 1 in Scheme 4 is designed to incorporate a nucleophilic end group, which allows the initiation of polyisocyanate blocks to occur from this terminus of the polyester.

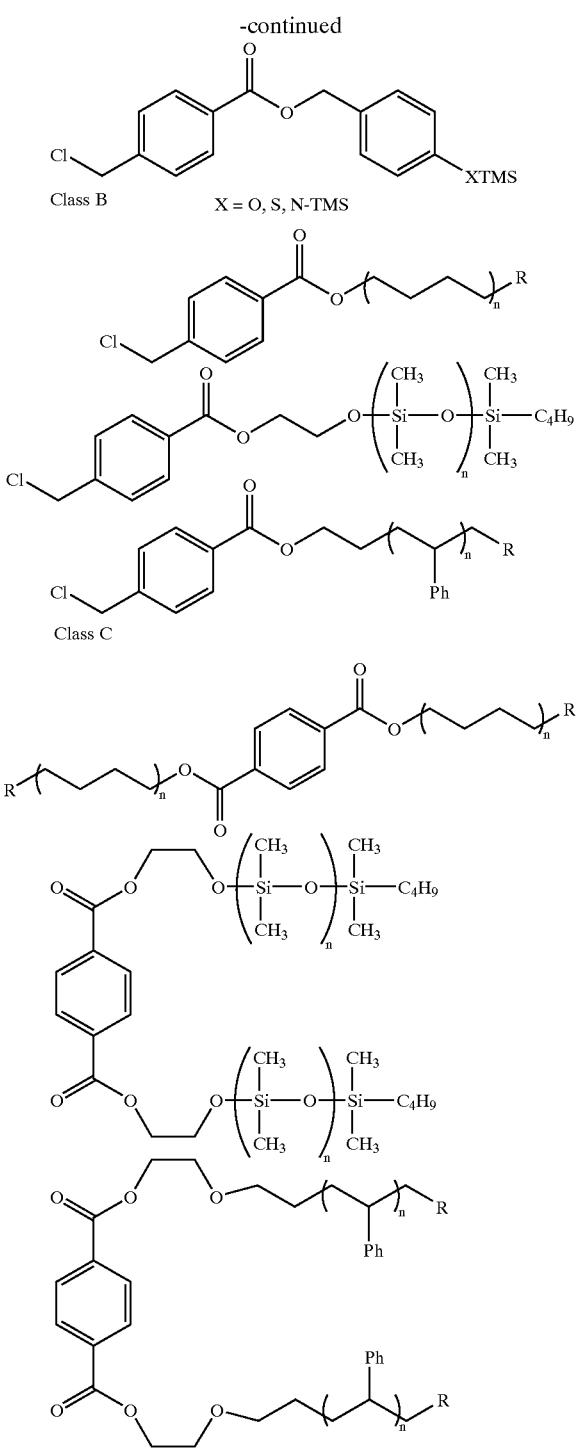

Class B  X = O, S, N-TMS

Class C

The asymmetric CTAs in class B represent materials that deliver a preformed polymer residue (e.g., PE, PDMS, and PS) onto the alkoxy end of a polyester. Alternate isomers of these esters may incorporate the polymer unit on the acyl end of the CTA, thereby delivering the polymeric residue or subunit to the opposite end of the polymer. This flexibility allows several ABC-type triblock polymers of the type described above to be synthesized where the A, B, and C segments are scrambled (e.g. PMMA-b-PS-b-PCL, PS-b-PCL-b-PMMA, and PCL-b-PMMA-b-PS). The symmetric CTAs of Class C also deliver a preformed polymer residue (e.g., PE, PDMS, and PS) onto the alkoxy end of the polyester. Transesterification reactions with the CTAs of Class C will result in ABA-type triblock polymers, where "A" is the preformed polymer residue and "B" is the polyester.

4. Metal Alkali Catalysts

Alkali metal catalysts of the present invention are, in general, alkali metal alkoxide clusters that catalyze ester and carbonate metathesis. Preferably, catalysts of the present invention are selected from the group consisting of:

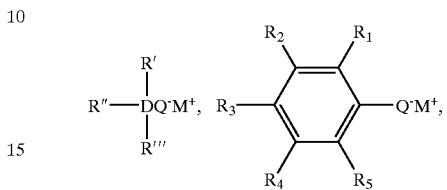

and mixtures thereof,
wherein D is selected from the group consisting of carbon and silicon; Q is selected from the group consisting of O, S, and NR; M is selected from the group consisting of lithium, sodium, potassium, rubidium, and cesium; and R, $R_1$, $R_2$, $R_3$, $R_4$, $R_5$, R', R", and R''' are each independently selected from the group consisting of H, O, halogen, Si, N, S, P, Cl to $C_{20}$ linear or branched alkyl, $C_3$ to $C_{10}$ cycloalkyl, and aromatic groups. In one preferred embodiment, Q is O, and R', R", and R''' may be either $C_1$ or $C_2$ alkyl. In a more preferred embodiment, the catalyst is KOtBu. Examples of these catalysts are disclosed in U.S. Provisional Application Serial No. 60/032,514, filed Dec. 20, 1996, and U.S. patent application Ser. No. 08/992,800, filed Dec. 18, 1997, which applications are incorporated herein by reference in their entirety.

Catalysts of this type have been shown to be highly active ($N_t$ up to $10^6$ T.O./h) catalysts for the ester metathesis reaction, illustrated below in equation (3). See M. G. Stanton and M. R. Gagne', *J. Am. Chem. Soc.* 119, 5075–76 (1997). This methodology has now been extended to polycarbonates, as illustrated by equation (4), below.

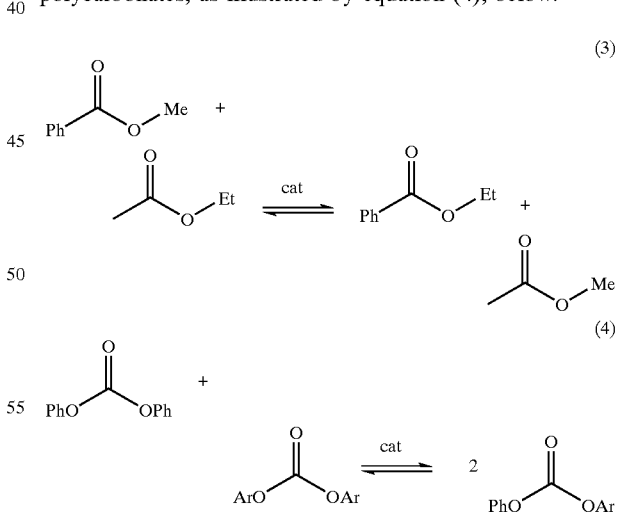

In the method of the present invention, it is desirable that catalysts have a pKA that is greater than or equal to both the functional group metathesized (i.e., the leaving group of the polymer) and the CTA. The term "catalyst" as used herein is specifically intended to encompass one, or a mixture of more than one catalyst of the present invention. The catalyst may be employed in varying suitable amounts, which amounts may be readily determined by the skilled artisan. Preferably, the amount of catalyst used ranges from about 0.001 mole percent to about 20 mole percent, and more preferably about 0.1 to about 2 mole percent, based upon the total moles of ester linkages present in the substrate compound.

B. Production of Telechelic Oligomers

The method of the present invention for producing telechelic oligomers is carried out as follows: a substrate compound, a chain transfer agent and an alkali metal catalyst, as defined herein, are combined either in the presence or in the absence of solvent. In combining the substrate compound with the CTA and the alkali metal catalyst, the desirability of having the $pK_a$s of the CTA, the catalyst, and the leaving group or functional group of the substrate compound correspond appropriately will usually dictate that when it is desired that an aromatic polymer be broken down into telechelic polymers, the CTA also be aromatic, while if an aliphatic polymer is desired to be broken down, an aliphatic CTA be used. Generally, the $pK_a$s of the CTA and the leaving or functional group of the substrate compound will be within less than about three $pK_a$ units of each other, will more preferably be within about one $pK_a$ unit of each other, and will most preferably be about the same. So, for example, if the $pK_a$ of the CTA is 15.0, the $pK_a$ of the leaving or functional group of the substrate compound will be no less than about 12.0 and no greater than about 18.0; more preferably no less than about 14.0 and no more than 16.0, and most preferably will be about 15.0. The $pK_a$ of the catalyst should be greater than or equal to the $pK_a$s of the CTA and the leaving or functional group of the substrate compound.

Preferably, the step of reacting the catalyst, CTA and substrate compound is carried out at a temperature ranging from about −78° C. to about 300° C., more preferably between about 0° C. and about 300° C., and most preferably between about 0° C. and about 250° C. The reaction pressure typically ranges from about 0 psig to about 10000 psig. Moreover, the reaction step preferably takes place between about 0.5 and about 60 minutes, but may take less time or more time depending on the reaction components and conditions.

The method of making the telechelic oligomer may be carried out in the presence or absence of an organic solvent. Exemplary organic solvents include, but are not limited to, hydrocarbons such as aliphatic, aromatic, and ethereal components. Specific solvents include toluene, xylene, cyclohexane, benzene, tetrahydronaphthalene, naphthalene, anisole, chlorobenzene, diethyl ether, dibutyl ether, diphenyl ether, tetrahydrofuran, dioxane, diglyme, dichloroethane, methylene chloride, and the like. Mixtures of any of the above may be used. When a solvent is present, an atmospheric pressure ranging from about 0 to about 10,000 psig may be employed. The solvent may be employed in various amounts, typically between about 0 and about 50 percent based on the weight of the starting ester monomers.

The method of the present invention may also be carried out in the gas phase, and more specifically in condensed gas or gases such as, for example, liquid or supercritical $CO_2$. Catalysts used in the reaction may optionally be fixed on a carrier support, such as one that contains $SiO_2$.

Additional ligands may be employed in the methods of the invention to accelerate the rates of reaction of esterification product formation or decomposition. Such ligands include, for example, polydentate ligands like crown ethers, cryptands, and mixtures thereof. These ligands are employed under processing conditions known to those skilled in the art. In a method of forming an esterification product, the ligands are preferably employed in an amount ranging from about 0.001 to about 10 mole percent, and more preferably from about 0.1 to about 5 mole percent. In the method of decomposing an esterification product, the ligands are preferably employed in an amount ranging from about 0.001 to about 10 mole percent, and more preferably from about 0.1 to about 5 mole percent.

C. Production of Block Copolymers

Telechelic oligomers produced by the methods described herein are useful in methods of producing copolymers bearing olefinic and polycondensate blocks, using methods known to those skilled in the art. Methods for producing block copolymers may involve, for example, combining the telechelic oligomers of the present invention with at least one additional compound, and reacting the telechelic polymer with the additional compound under polymerization conditions known in the art to yield the desired block copolymers. Examples of these additional compounds include, but are not limited to, monomers of styrene and styrene derivatives, acrylates, methyl acrylate, methyl methacrylate, fluorinated acrylate, acrylonitrile, ethylene, butadiene, vinyl acetate, and vinyl chloride. Block copolymers may also be made according to methods of the present invention by reacting telechelic polymers of the present invention (e.g., allyl-terminated telechelics) with polymeric residues (e.g., silane-terminated PDMS) under suitable reaction conditions in order to produce A-B-A block copolymers.

Particularly preferred methods of making block copolymers include those methods defined herein as "living" polymerization processes, wherein the term "living" polymerization process includes those polymerization processes classically defined in the art as living polymerization processes (see, e.g., M. Szwarc, *Carbanions, Living Polymers and Electron-Transfer Processes* (Wiley & Sons, New York, 1968)), as well as those known in the art as "living/controlled" polymerization processes (e.g., free radical polymerizations, group transfer polymerization, ring opening of lactone polymerizations, and ring-opening metathesis polymerizations (ROMP); see, e.g., K. Matyjaszewski. "Controlled radical polymerization," *ACS Symposium Series* 685 (1998); C. J. Hawker, *Acc. Chem. Res.* 30, 373–383 (1997); D. Brunelle, *Polym. Prepr.* 38(2), 381 (1997)). Polymerization methods useful in the practice of the present invention include, for example, anionic polymerization (see, R. Stadler, *Macromol. Symp.* 117, 153 (1997)); atom free transfer radical polymerization (ATRP) methods (see, e.g., K. Matyjaszewski, *Polym. Prepr.* 38(2), 383–4 (1997)), nitroxide mediated radical polymerization (NMRP) methods, such as TEMPO-mediated radical polymerization (see, N. A. Listigover et al., *Polym. Prepr.* 38(2), 719 (1997); Y. Gnanou et al., *Polym. Prepr.* 38(1), 729 (1997); M. Baumert et al., *Macromol. Rapid Commun.* 18, 787–794 (1997)); thiocarbamate (e.g., INFER) methods (see, D. Betts et al., *Polym. Prepr.* 38(1), 760 (1997); and acyclic diene methathesis (ADMET) methods (see M. D. Watson et al., *Polym. Prepr.* 38(2) 474–475 (1997); K. Wagener, *Polym. Prepr.* 38(2), 474(1997)).

The methods of the present invention thus encompasses the production of or di and triblock ester carbonate-containing polymers, (e.g., A-B-A (di) or A-B-C (tri)), as well as $(AB)_n$ multiblock containing copolymers (e.g., (PC-PB)$_n$ and (PC-PE)$_n$). Functional groups of the telechelic oligomers or functional groups derived therefrom may then be subjected to further chain extension. Such groups include, but are not limited to: allyl, hexyl, vinyl, aldehyde bearing, dibromo, (α-chloro (or bromo)-α.'alky-carbonyl, chloro(or bromo)methylphenyl, thiocarbamyl, and nitroxide bearing groups. Block copolymers that may be produced by methods of the present invention include, but are not limited to, the following:

PS-PC-PS

PMMA-PC-PMMA

Poly(X)-PC-Poly(X) (with X denoting any olefinic monomer which can be polymerized by ATRP, NMRP or INIFER)
PDMS-PC-PDMS
SAN-PC-SAN
PMMA-PS-PC-PS-PMMA
PB-PS-PC-PS-PB
PFOA-PC-PFOA
PS-PECL
PMMA-PS-PECL
PS-PECL-PVA
PS-PECL-PDMS
PS-PECL-PEB
PS-PLA
PS-PECL-PS
PC-(PS)$_n$
Poly(X)-A-Poly(Y) (wherein A=aliphatic polyester, X,Y= are monomers that can be polymerized by ATRP, NMRP, INIFER)

In one embodiment of the invention, the methods described herein are used to produce the novel block copolymer polycaprolactone-polystyrene-polymethylmethacrylate (PCL-PS-PMMA). In a preferred embodiment, the PCL-PS-PMMA block copolymer has a polydispersity index (PDI) of between and including about 1.0 to about 10.0, more preferably between and including about 1.0 to about 2.0, and is most preferably about less than about 1.5. Preferably, in the PCL-PS-PMMA block copolymer, the average molecular weight ($M_n$) of PCL is between about 1000 to about 10,000 g/mol, inclusive; the $M_n$ of PS is between about 1000 to about 500,000 g/mol, inclusive; and the $M_n$ of PMMA is between about 500 to about 500,000 g/mol, inclusive.

In one embodiment of the invention, the methods described herein are used to produce the novel block copolymer polystyrene$_n$-polycaprolactone-polystyrene$_m$ (PS$_n$-PCL-PS$_m$). In a preferred embodiment, the PS$_n$-PCL-PS$_m$ block copolymer has a PDI of between and including about 1.0 to about 10.0, more preferably between and including about 1.0 to about 2.0, and is most preferably less than about 1.5. Preferably, in the PS$_n$-PCL-PS$_m$ block copolymer, the average molecular weight ($M_n$) of PS$_n$ is between about 1000 to about 500,000 g/mol, inclusive; the $M_n$ of PCL is between about 1000 to about 10,000 g/mol, inclusive; and the $M_n$ of PS$_m$ is between about 1000 to about 500,000 g/mol, inclusive.

The following Examples are provided to illustrate the present invention, and should not be construed as limiting thereof. In these Examples, ATRP means atom transfer radical polymerization, ECL or e-CL means epsilon-caprolactone, mg means milligrams, g means grams, h means hours, PDI means polydispersity index (Mw/Mn), $M_w$ means average weight molecular weight, $M_n$ means average number molecular weight), mol means moles, mL means milliliters; r.t. means room temperature, GPC means gel permeation chromatography, and TEMPO means 2,2,6,6-tetramethylpiperidinyl-1-oxy.

EXAMPLE 1

Breakdown of Polycarbonates (PC) (Production of "A" Blocks)

A high molecular weight commercial polycarbonate was depolymerized in the presence of a functionalized CTA according to Scheme 5, below.

Scheme 5

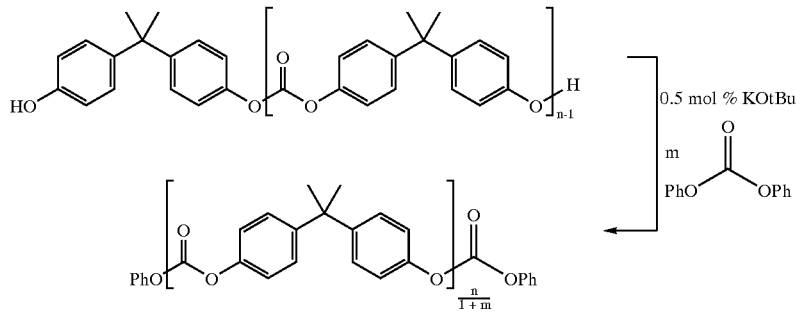

Specifically, high molecular weight bisphenol A polycarbonate ($M_n$=22,000 g mol$^{-1}$; PDI=2.15) was reacted with 1–20 molar equivalents of diphenyl carbonate in the presence of 0.5 mol % KOtBu catalyst in THF. This reaction resulted in a controlled breakdown of the molecular weight as assayed by GPC, as shown in FIG. 1 and in Table 1, entries 3–7. Control experiments showed that in the absence of catalyst, no breakdown in molecular weight occured. In the absence of CTA, the catalysts lowered the MW, but with an increase in polydispersity ($M_n$=7200, PDI=2.42, $T_g$=42° C.). The reported MW's are relative to polystyrene standards and are uncorrected. Initial breakdown was rapid, as quenching of the reaction solutions after 2–4 minutes yielded an average MW of 5000 g mol$^{-1}$ and several oligomer peaks (PDI=1.85). Longer reaction times homogenized the oligomer distribution and generated narrowed unimodal GPC traces, shown in FIG. 1. Precipitating the resulting product from methanol yields the polymers shown in Table 1. The final MW was found to be controlled by the initial ratio of diphenylcarbonate to PC and the degree of polymerization (DP) of the starting polymer. Universal calibration GPC using toluene as an internal flow standard on the sample in entry 7 of Table 1 further refined the DP in this sample to 5.5, close to the theoretical value of 5 based on the initial CTA/polymer ratio. The breakdown process also resulted in a narrowing of the polydispersity of the product with increasing equivalents of CTA.

The well-behaved reactivity observed with diphenylcarbonate CTA carries over into alternative diarylcarbonates, as illustrated in Table 1. Similarly, dinapthyl-(entry 8), dicyanobiphenyl-(entry 9), and di-2allyl-phenyl-carbonate (entry 10) were utilized as CTA's for the depolymerization reaction. All substrates gave rapid reactions and yielded the expected homotelechelic materials. In addition to GPC, the DP of the polymer in entry 10 was determined by integrating the allyl and methyl resonances in the $^1$H NMR, with a delay of 10 sec between scans being utilized to minimize integration errors due to differences in relaxation times. This method gave an average DP of 12, in close agreement with the theoretical DP for this experiment. Thermal characterization (DSC) of the resulting polymers showed that, as expected, the glass transition temperature (Tg) was sensitive to both the MW of the oligomer and the identitity of the end group.

The napthyl and cyanobiphenyl functionalities (entries 8 and 9) have unique UV absorbances, making them suitable endgroup-specific spectroscopic probes. See, e.g., C.O. Mork, D. B. Priddy, *J. Appl. Polym. Sci.* 45, 2289–2301 (1992). The evolution of the UV/Vis spectrum of the GPC as a function of reaction time was used to monitor the incorporation of these endgroups into the polymer ensemble. A 2-dimensional contour plot of the GPC/UV/Vis spectrum of a mixture of the dicyanobiphenyl carbonate (CNBiPh) and PC prior to the addition of catalyst was analyzed. The lack of PC tailing to wavelengths greater than 290 nm is readily apparent while the CTA absorbs strongly to 320 $\mu$m. After 4 min at room temperature the retention time of the polymer increased (decreased molecular weight), and absorbed to longer wavelengths. The fine structure revealed the presence of low molecular weight oligomers and CTA. After 4 hours, the precipitated polymer showed a uniform absorbance profile tailing to 320 nm that was indicative of a homogeneous distribution of cyanobiphenyl endgroups throughout the MW range. The napthyl CTA behaved similarly.

The distribution of CTA end groups into the polymers was also monitored by HPLC under the following conditions: initial solvent mixture was THE/Hexanes (30/70) with a gradient elution of 0.5%THF/min. to 45% THE, 1 mL/min on a cyano-terminated silica gel column LiCHROSPHERE® 100CN (250×4 mm, 5 gm pore size, 100 gm particle size). Analysis of the product oligomers using gradient elution techniques allowed a majority of the oligomers to be cleanly separated. The pattern and relative intensity of peaks in the chromatograms obtained at 300 nm and 254 nm were superimposable, continuing the uniform distribution of end groups in each oligomer chain. To facilitate the assignment of the absorbances in the HPLC trace, the smallest PC telechelic, and CTA were spiked into the oligomer solutions. The PC telechelic polymer was synthesized from the bischloroformate of biphenol A and 4'-cyanobiphenol. Counting the major peaks to maximum +1 gave a DP=5, close to theory for this experiment (entry 9, Table 1)

TABLE I

GPC[a] and DSC[b] Data for Functionalized Polycarbonates[c]

| Entry | CTA | CTA Equivalents moles | Mw g/moles | Mn g/moles | PDI | DP exp. | DP theor. | Tg ° C. |
|---|---|---|---|---|---|---|---|---|
| 1 | Starting Material[d] | 0 | 47000 | 22000 | 2.15 | 86 | — | 149 |
| 2 | Control | 0 | 17300 | 7200 | 2.42 | 28 | 57 | 142 |
| 3 | (214) | 1 | 19000 | 7700 | 2.43 | 30 | 43 | 140 |
| 4 | (214) | 4 | 10000 | 5100 | 1.92 | 20 | 18 | 126 |
| 5 | (214) | 7 | 7000 | 3900 | 1.84 | 15 | 12 | 120 |
| 6 | (214) | 10 | 6000 | 3900 | 1.88 | 15 | 9 | 113 |
| 7 | (214) | 20 | 4000 | 2900 | 1.37 | 11 | 5 | 98 |
| 8 | (314) | 10 | 5700 | 3300 | 1.73 | 12 | 9 | 114 |
| 9 | (436) | 20 | 3900 | 2800 | 1.36 | 10 | 5 | 120 |
| 10 | (296) | 10 | 6400 | 3900 3200[e] | 1.61 | 15 12 | 9 9 | 108 |

[a]Gel permeation chromatography was carried out in THF at r.t. against polystyrene standards;
[b]differential scanning calometry was run with 20° C./min., glass transitions were determined from the 2nd heating;
[c]typical reactions were carried out under Ar in 10 ml THF with 550 mg of poly(bisphenolA)carbonate, CTA, and 1.2 mg KO$^t$Bu for 240 min; the resulting functionalized polymer was precipitated into MeOH, filtered, washed, and dried under high vacuum;
[d]poly(bisphenolA)carbonate prior to be used was dissolved in THF, filtered from insoluble parts, precipated into MeOH, filtered, washed, and dried;
[e]determined by $^1$H-NMR.

EXAMPLE 1A

Breakdown of PC with Bis Allyl-BisA Carbonate 556 mg of polycarbonate ($M_n$ 23,700 g/mol; GPC) and 200 mg of bis allyl-BisA-carbonate (compound 10, below), were dissolved in 10 mL of dry THE and 1.2 mg of KOtBu in 2 mL of THE added upon stirring at room temperature. After 4 h the solution was precipitated into an excess of methanol. The solids were filtered and dried to give allyl terminated PC oligomers with $M_n$=5,000 g/mol, PDI 1.7 (GPC).

EXAMPLE 1B

Breakdown of PC with Di(4-Methylbenzoate) Carbonate 515 mg of polycarbonate ($M_n$ 13,000 g/mol; GPC) and 132 mg of di(4-methylbenzoate)-carbonate (compound 12, below), were dissolved in 10 mL of dry THF and 1.1 mg of KOtBu in 2 mL of THF added upon stirring at room temperature under inert atmospheric conditions. After 1 h the solution was precipitated into an excess of methanol. The solids were filtered and dried to give 4-methylbenzoate terminated PC oligomers, $M_n$=1,600 g/mol, PDI=1.58 (GPC).

EXAMPLE 1C

Breakdown of PC With 1,1,1-Tris(4-Allylcarbonate Phenyl)Ethane 508 mg of polycarbonate ($M_n$=12,000 g/mol; GPC) and 223 mg of 1,1,1-Tris(4-Allylcarbonate phenyl) ethane) (compound 14, below), were dissolved in 10 mL of dry THF and 1.12 mg of KOtBu in 2 mL of THF added upon stirring at room temperature under inert atmospheric conditions. After 1 h the solution was precipitated into excess of methanol, and the solids filtered and dried to give allylcarbonate terminated PC oligomers of $M_n$=3,000 g/mol, PDI= 2.0 (GPC).

EXAMPLE 1D

Ring Opening/Breakdown of PC with 1,1,1-Tris(4-Allylcarbonate Phenyl) Ethane 500 mg of cyclic polycarbonate ($M_n$=850 g/mol; GPC) and 112 mg of 1,1,1-Tris(4-Allylcarbonate phenyl) ethane) (compound 14, below), were dissolved in 7.5 mL of dry THF and 4.5 mg of KOtBu in 2 mL of THF added upon stirring at r.t. under inert atmosphere. After 1 h the solution was precipitated into an excess of methanol, the solids filtered and dried to give allylcarbonate terminated branched PC oligomers; $M_n$=2200 g/mol (¹H NMR); $M_n$=2,900 g/mol, PDI=2.1 (GPC).

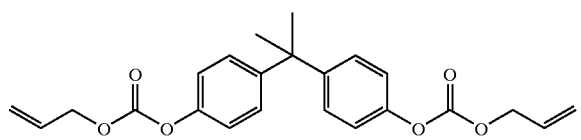

-continued

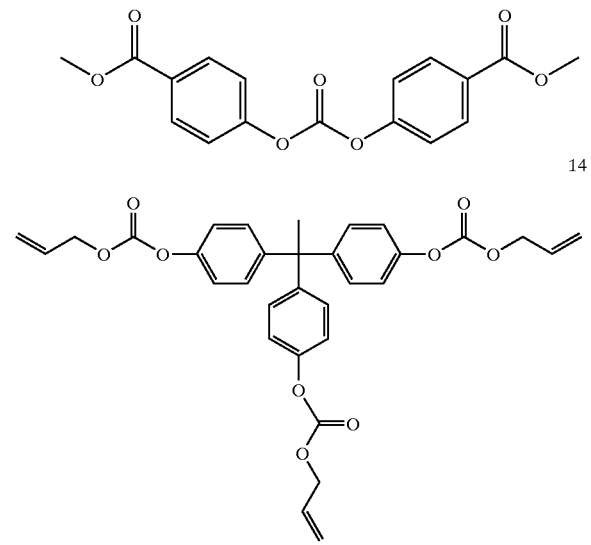

EXAMPLES 2A–2I

Production of Telechelic Polyesters

EXAMPLE 2A

Ring-Opening of Caprolactone in the Presence of CTA 4.4 ml of (4-Chloromethyl)-6-hex-1-ene benzo ate was trans-esterified with e-CL to give a telechelic polymer. Using these steps, a telechelic ester was prepared utilizing the difunctional monoester incorporating a benzyl chloride and alkenyl functionalities, as illustrated in Scheme 6, below.

Scheme 6

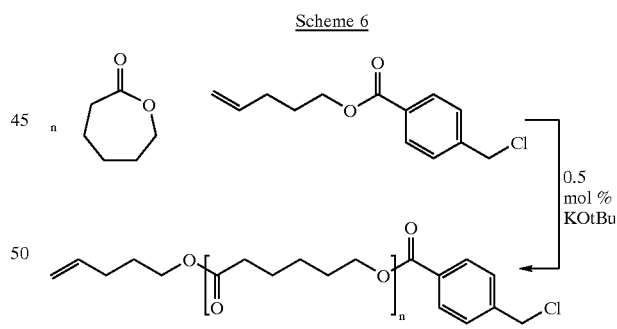

Reaction of a 20:1 ratio of caprolactone:CTA in the presence of 0.5 mol % KOtBu in THF resulted in a polymer that was characterized by GPC, ¹H NMR, HPLC, and electrospray mass spectrometry. Direct integration of the terminal resonances in the NMR gave a molecular weight ($M_n$) of 3500 g/mol. GPC analysis showed a unimodal distribution with a PDI=1.4. The distribution of oligomers was determined by HPLC and electrospray mass spectroscopy analysis, which further confirmed that each polymer chain contained the expected CTA derived end group. A control experiment with no catalyst showed no molecular weight build-up. In another control experiment, ring opening of ε-caprolactone with KOtBu without the CTA under the reaction conditions described in this example resulted in a polymer with $M_n$=56,000 and PDI=1.7.

EXAMPLE 2B

Synthesis of Hexenenyl-PCL-(3-Chloromethyl) benzoate 4.42 mL (0.04 mol) of e-CL in 22 mL of dry THF and 1.03 g (0.004 mol) of Hexenenyl-(3-Chloromethyl) benzoate (compound 20, below) with the addition of 22.4 mg of KOtBu in 2 mL of dry THF were stirred for 5 min. at room temperature under an inert atmosphere and subsequently precipitated into 200/100 mL of petrol ether/methanol. The solids were filtered and dried to give 1.56 g of hexenenyl-PCL-(3-Chloromethyl)benzoate with molecular weight of $M_n$=3,250 ($^1$H-NMR), $M_n$=5,600 g/mol (GPC) and polydispersity (PDI)=1.16.

EXAMPLE 2C

Synthesis of TEMPO-phenylethyl-PCL-benzoate Telechelic Polymers 2.35 g (0.02 mol) of e-CL in 10 mL of dry THF and 157 mg (0.0004 mol) of TEMPO-Phenylethylbenzoate (compound 22, below), with the addition of 11.2 mg of KOtBu in 2 mL of dry THF were stirred for 11 min. at room temperature under inert atmosphere and subsequently precipitated into 200/100 mL of pentane/methanol. The solids were filtered and dried to give 1.24 g of TEMPO-phenylethyl-PCL-benzoate with molecular weight of $M_n$=7,200 g/mol (GPC) and polydispersity (PDI)=1.94.

EXAMPLE 2D

Allyl-PCL-Chloroacetate 2.28 g (0.02 mol) of e-CL in 10 mL of dry THF and 108 mg (0.0008 mol) of allyl-Chloroacetate (compound 24, below) with the addition of 11.2 mg of KOtBu in 2 mL of dry THF were stirred for 5 min. at r.t. under inert atmosphere and subsequently precipitated into 200/100 mL of pentane/methanol. The solids were filtered and dried to give 1.1 g of allyl-PCL-chloroacetate with a molecular weight of $M_n$=3,500 ($^1$H-NMR), $M_n$=3,700 g/mol (GPC) and PDI=1.46.

EXAMPLE 2E

Allyl-PCL-Chloroacetate 2.28 g (0.02 mol) of e-CL in 10 mL of dry THE and 54 mg (0.0004 mol) of allyl-Chloroacetate (compound 24, below) with the addition of 11.2 mg of KOtBu in 2 mL of dry THE were stirred for 5 min. at r.t. under inert atmosphere and subsequently precipitated into 200/100 mL of pentane/methanol. The solids were filtered and dried to give 1.1 g of allyl-PCL-chloroacetate with molecular weight of $M_n$=9,400 ($^1$H-NMR), $M_n$=9,300 g/mol (GPC) and PDI=1.40.

EXAMPLE 2F

Pyrenebutyl-PCL-(3-Chloromethyl)benzoate 1.14 g (0.01 mol) of e-CL in 20 mL of dry THF and 427 mg (0.001 mol) of Pyrenebutyl-(3-chloromethyl)benzoate (compound 26, below) with the addition of 5.6 mg of KOtBu in 2 mL of dry THF were stirred for 5 min. at room temperature. under inert atmosphere and subsequently precipitated into 200/100 mL of pentane/methanol. The solids were filtered and dried to give 1.3 g of pyrenebutyl-PCL-(3-Chloromethyl)benzoate. After reprecipitation from THF into pentane/methanol and subsequent extractions with diethylether, 752 mg of product were obtained with $M_n$=6,100 g/mol ($^1$H-NMR). $M_n$=9,800 g/mol (GPC) and PDI=2.12.

EXAMPLE 2G

TEMPO-phenylethyl-PCL-(3-Chloromethyl) benzoate 1.71 g (0.015 mol) of e-CL in 8 mL of dry THF and 405 mg (0.001 mol) of TEMPO-phenylethyl-(3-chloromethyl) benzoate (compound 28, below) with the addition of 8.3 mg of KOtBu in 1 mL of dry THF were stirred for 5 min. at r.t. under inert atmosphere and subsequently precipitated into 200/50 mL of methanol/water. The solids were filtered and dried to give 1.8 g of crude TEMPO-phenylethyl-PCL-(3-Chloromethyl)benzoate. After extraction with diethylether, 900 mg of product was obtained with $M_n$=5,600 g/mol ($^1$H-NMR), $M_n$=4,300 g/mol (GPC) and PDI=1.25.

EXAMPLE 2H

TEMPO-phenylethyl-PCL-(3-Bromomethyl) benzoate 900 mg of TEMPO-phenylethyl-PCL-(3-Chloromethyl) benzoate (as synthesized in Example 2G) were dissolved in 15 mL of acetone and 1.5 g LiBr added and refluxed for 2 h under inert atmosphere and then precipitated into 200/200 mL methanol/water. After cooling the precipitate was filtered and dried to give 680 mg of TEMPO-phenylethyl-PCL-(3-bromomethyl)benzoate (95% substitution of Cl with Br by $^1$H NMR). Repetition of the procedure with filtering through silica gel before precipitation into 300 mL of pentane yielded 540 mg of pure TEMPO-phenylethyl-PCL-(3-Bromomethyl)benzoate.

EXAMPLE 2I

Pentylaldehyde-PCL-(3-Chloromethyl)benzoate 356 mg of hexenenyl-PCL-(3-Chloromethyl)benzoate (Example 2B) ($M_n$=5,300 g/mol and PDI=1.20 by GPC) were dissolved in 6 mL of THF and 16.2 mg of N-morpholineoxide added and 0.4 mmol of $OSO_4$ solution in water added and stirred for 3.5 h at r.t. Then, 44 mg of $NaIO_3$ were added and stirred at r.t for 2.5 h. The THF solution was precipitated into excess of methanol and the solids filtered and dried. The yield was 300 mg of pure pentylaldehyde-PCL-(3-chloromethyl)benzoate (by $^1$H NMR) with $M_n$=5,600 g/mol (GPC) and PDI=1.20.

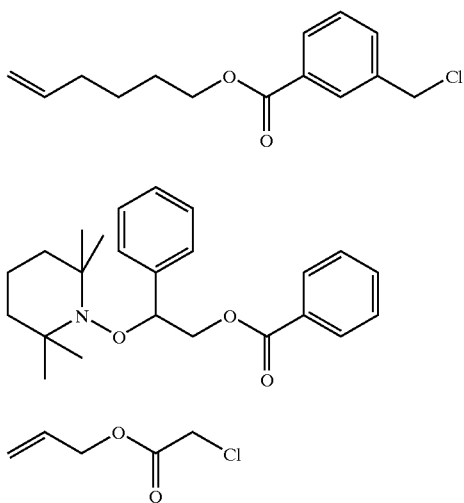

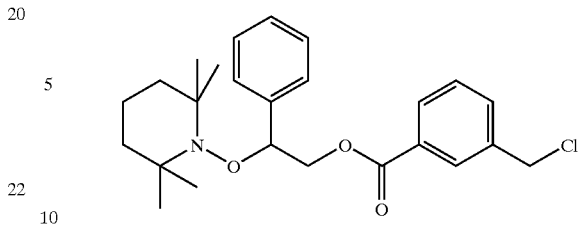

EXAMPLE 3

Production of Block Copolymers

Derivatization to an ABC triblock copolymer was carried out with styrene and subsequently with methylmethacrylate (PCL-b-PS-b-PMMA) according to the reaction set forth below in Scheme 7, and according to the following experimental method: 356 mg of the telechelic polymer produced in Example 2A was dissolved in 1.0 g of styrene and polymerized via ATRP with CuCl and bipyridine at 130° C. for 5 h. As a result, a chloro-PS-PECL-hexene AB block copolymer of $M_n$=23,000 g/mol and $M_n$=17,000 g/mol and PDI=1.33 was obtained. Further polymerization of the AB blockcopolymer with methylmethacrylate (MMA) via ATRP at 130° C. for 8 h gave, after fractionation, the ABC triblock copolymer PCL-PS-PMMA of $M_n$=229,000 g/mol ($^1$H NMR, PCL: 3,000; PS:16,000; PMMA: 210,000 g/mol); $M_n$=235,000 g/mol, $M_n$=137,000 g/mol, and PDI 1.73 (GPC).

Scheme 7

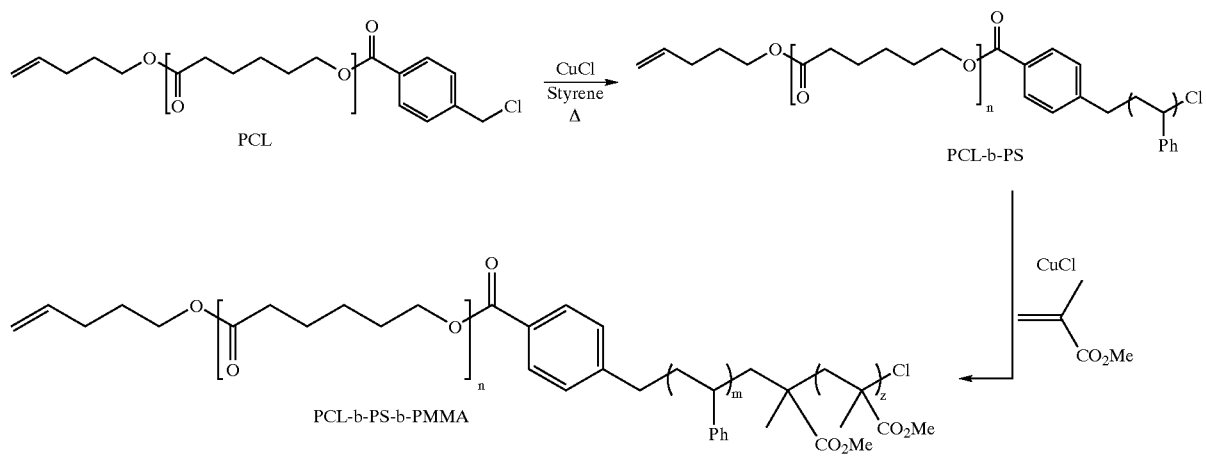

EXAMPLE 3A

Hexene-Polycaprolactone-Polystyrene-Br: PCL-PS 365 mg of hexene-PCL-Br (as synthesized in Example 2H) was dissolved in 3 g of destabilized styrene and added to 14.6 mg CuBr, 23.3 mg distilled hexamethyltriethylene-tetramine and 6 g destabilized styrene in a schlenk flask. The reaction mixture was sonicated and subjected to three freeze, pump, thaw cycles. The then sealed flask under vacuum was placed in an oil bath of 105° C. for 20 h. Afterwards, 50 mL of THF was added, the solution filtered through silica, and precipitated into 1000/50 mL of methanol/water. The solids were filtered and dried, yielding 1.58 g of PCL-PS. After three extractions with 100 mL of hot ethanol 1.24 g of product were obtained. Another precipitation from ethylacetate into pentanes did not change molecular weight distri- -continued

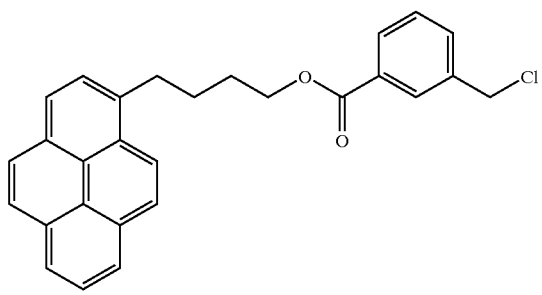

EXAMPLE 3B

Hexene-Polycaprolactone-Polystyrene-Br: PCL-PS 320 mg of hexene-PCL-Br (as synthesized in Example 2H) was dissolved in 14.5 mg CuBr, 23.4 mg distilled hexamethyltriethylenetetramine and 3 g destabilized styrene in a schlenk flask. The reaction mixture was sonicated and subjected to three freeze, pump, thaw cycles. The then sealed flask under vacuum was placed in an oil bath of 105° C. for 16 h. Afterwards, THF was added, the solution filtered through silica, and precipitated into methanol/water. The solids were filtered and dried, and extracted once with of hot ethanol to give 0.50 g of the PCL-PS product. $M_n$=72,000 g/mol ($^1$H NMR; PCL: 5,600; PS: 67,000 g/mol); $M_n$=95,000 g/mol, PDI=1.33 (GPC).

EXAMPLE 3C

Hexene-Polycaprolactone-Polystyrene-PMMA-Br: PCL-PS-PMMA 400 mg of hexene-PCL-PS-Br (from Example 3A) was placed into a Schlenk flask and 0.43 mg CuCl and 1.06 mg of distilled hexamethyltriethylenetetramine in 0.19 mL of destabilized methyl methacrylate and 0.61 mL destabilized methyl methacrylate added. The reaction mixture was subjected to three freeze-pump-thaw cycles. The then sealed flask under vacuum was placed in an oil bath of 95° C. for 16 h. Afterwards, 10 mL of THF was added, the solution filtered through alumina, and precipitated into 120 mL of water. The solids were filtered and dried, yielding 790 mg of PCL-PS-PMMA, which according to GPC had starting material left. Selective reprecipitation from ethylacetate into cyclohexane/methanol yielded 424 mg of clean product. $M_n$=284,000 g/mol ($^1$H NMR; PCL: 5,600; PS: 100,000; PMMA: 178,000 g/mol). $M_n$=235,000 g/mol, PDI=1.31 (GPC).

EXAMPLE 3D

Pyrene-Polycaprolactone-Polystyrene-Cl: PCL-PS 280 mg of pyrene-PCL-Cl (as synthesized in Example 2F) was dissolved in destabilized styrene and added to 4.5 mg CuCl, 11.4 mg distilled hexamethyltriethylenetetramine and more destabilized styrene (total amount 2.5 g) in a schlenk flask. The reaction mixture was subjected to three freeze, pump, thaw cycles. The then sealed flask under vacuum was placed in an oil bath of 110° C. for 16 h. Afterwards, 25 mL of THF was added, the solution filtered through alumina, and precipitated into 350/25 mL methanol/water. The solids were filtered and dried, and extracted three times with hot ethanol to give 1.0 g of PCL-PS product. $M_n$=64,000 g/mol, PS=54,000 g/mol, PCL=10,000 g/mol (H NMR); $M_n$=48,000 g/mol, PDI=1.28 (GPC).

EXAMPLE 3E

Hexene-Polycaprolactone-Polystyrene-Cl: PCL-PS 350 mg of hexene-PCL-Cl (from Example 2B) was dissolved in destabilized styrene and added to 14.3 mg CuBr, 23 mg distilled hexamethyltriethylenetetramine and more destabilized styrene (5.8 g total) in a schlenk flask. The reaction mixture was subjected to three freeze, pump, thaw cycles. The then sealed flask under vacuum was placed in an oil bath of 110° C. for 24 h. Afterwards, 20 mL of THF was added, the solution filtered through alumina, and precipitated into 450 mL of methanol. The solids were filtered and dried (2.05 g) and extracted three times with of hot ethanol to give 1.91 g of PCL-PS product. $M_n$=47,000 g/mol, PS=44,000 g/mol ($^1$H NMR); $M_n$=39,000 g/mol, PDI=1.30 (GPC).

EXAMPLE 3F

Hexene-Polycaprolactone-Polystyrene-PMMA-Cl: PCL-PS-PMMA 523 mg of hexene-PCL-PS-Br (from Example 3E) was dissolved in destabilized methyl methacrylate and added to 1.4 mg CuBr and 2.4 mg of distilled hexamethyltriethylenetetramine in destabilized methyl methacrylate (1.95 g total) and 1.30 g dry anisole in a schlenk flask. The reaction mixture was subjected to three freeze, pump, thaw cycles. The then sealed flask under vacuum was placed in an oil bath of 90° C. for 8 h. Afterwards, 50 mL of THF was added, the solution filtered through alumina, and precipitated into 400 mL of methanol. The solids were filtered and dried, yielding 1200 mg of PCL-PS-PMMA, which according to GPC had starting material left. Three selective reprecipitations from ethylacetate into cyclohexane/methanol yielded 700 mg of clean product. $M_n$=270,000 g/mol, PMMA=227,000 g/mol ($^1$H NMR); $M_n$=190,000 g/mol, PDI=1.74 (GPC).

EXAMPLE 3G

TEMPO-Polycaprolactone-Polymethylmethacrylate-Br: PCL-PMMA 452 mg of a TEMPO-PCL-(3-Bromomethyl)benzoate (from Example 2H) was added to 8.4 mg of CuCl, 18.5 mg of distilled hexamethyltriethylenetetramine, and 4.13 g of destabilized methylmethacrylate and 4 mL of anisole. The solution was subjected to three freeze-pump-thaw cycles and placed sealed under vacuum in an oilbath at 95° C. for 20 h and stirred. After this, ethylacetate was added, filtered through alumina and precipitated into 200/200 mL of pentane/methanol. The solids were filtered and dried to give 332 mg of PCL-PMMA product with $M_n$=6,800 g/mol ($^1$H NMR; PCL=6,100 g/mol; PMMA=700 g/mol). $M_n$=5,000 g/mol (GPC), PDI=1.22.

EXAMPLE 3H

TEMPO-Polystyrene-Polycaprolactone-Polystyrene-Br: PS-PCL-PMMA 210 mg of TEMPO-PCL-PMMA (from Example 3G) was added to 3.9 mg acetanhydride, and 920 mg of destabilized styrene. The solution was subjected to three freeze-pump-thaw cycles, vented with argon and placed in an oil bath at 135° C. for 4 h under inert atmosphere and stirred. After 4 h, 5 mL of THF was added and precipitated into 350 mL of methanol. The solids were filtered and dried to give 116 mg of isolated PS-PCL-PMMA product with $M_n$=22,000 g/mol ($^1$H NMR; PS=12,600 g/mol; PCL=8,300 g/mol, PMMA=700 g/mol). $M_n$=20,300 g/mol (GPC), PDI=1.33.

EXAMPLE 3I

Polystyrene-Polycaprolactone-(3-Chloromethyl) benzoate: $PS_n$-PCL-Cl 750 mg of a telechelic PCL similar to that of Example 2G, ($M_n$=5,200 g/mol, PDI=1.31) was added to 15.3 mg acetanhydride, and 3.12 g of destabilized styrene. The solution was subjected to three freeze-pump-thaw cycles, vented with argon and placed in an oil bath at 135° C. for 4 h under inert atmosphere and stirred. After 4 h, 10 mL of THF was added and precipitated into 500 mL of methanol. The solids were filtered and dried to give 2.05 g of $PS_n$-PCL-Cl product with $M_n$=15,200 g/mol ($^1$H NMR; PS=10,000 g/mol; PCL=5,200 g/mol). $M_n$=15,500 g/mol (GPC), PDI=1.19.

EXAMPLE 3J

Polystyrene-Polycaprolactone-(3-Bromomethyl) benzoate: $PS_n$-PCL-Br 950 mg of $PS_n$-PCL-Cl from Example 3I were dissolved in 50 mL of acetone and added 660 mg of LiBr. After 2 h reflux the solution was precipitated into 1000/50 mL of methanol/water to yield, after drying, 870 mg of $PS_n$-PCL-Br product in 92% conversion of the Cl to Br.

EXAMPLE 3K

Polystyrene-Polycaprolactone-Polystyrene: $PS_n$-PCL-$PS_m$ 395 mg of a PS-PCL-(3-Chloromethyl)benzoate from Example 3I was added to 3.0 mg of CuCl, 6.9 mg of distilled hexamethyltriethylenetetramine, and 1.26 g of destabilized styrene. The solution was subjected to three freeze-pump-thaw cycles, vented with nitrogen and placed in an oil bath at 135° C. for 4 h under inert atmosphere and stirred. After 4 h, 15 mL of THF was added and the solution filtered through alumina and precipitated into 500 mL of methanol. The solids were filtered and dried to give 922 mg of $PS_n$-PCL-$PS_m$ product with $M_n$=48,000 g/mol ($^1$H NMR; PS (total)=9.8 PCL). $M_n$=36,000 g/mol (GPC), PDI=1.39.

EXAMPLE 3L

Polystyrene-Polycaprolactone-Polystyrene: $PS_n$-PCL-$PS_m$ 275 mg of a telechelic PCL similar to that produced in Example 2G, ($M_n$=5,600 g/mol, PDI=1.27) was added to 4.8 mg of CuCl, 11.5 mg of distilled hexamethyltriethylenetetramine, 5.1 mg acetanhydride, and 3.2 g of destabilized styrene. The solution was subjected to three freeze-pump-thaw cycles, vented with nitrogen and placed in an oil bath at 135° C. for 4 h under inert atmosphere and stirred. After 4 h, 10 mL of THF was added and the solution filtered through alumina and precipitated into 500 mL of methanol. The solids were filtered and dried to give 524 mg of $PS_n$-PCL-$PS_m$ product with $M_n$=29,500 g/mol ($^1$H NMR; PS (total)=5.7 PCL), $M_n$=19,000 g/mol (GPC), PDI=1.34.

EXAMPLE 3M

Polystyrene-Polycaprolactone-Polystyrene: $PS_n$-PCL-$PS_m$ 275 mg of a telechelic PCL similar to that produced in Example 2G, (Mn=5,600 g/mol, PDI=1.27) was added to 4.8 mg of CuCl, 11.5 mg of distilled hexamethyltriethylenetetramine, 5.1 mg acetanhydride, and 3.2 g of destabilized styrene. The solution was subjected to three freeze-pump-thaw cycles, vented with nitrogen and placed in an oil bath at 135° C. for 4 h under inert atmosphere and stirred. After 4 h, 10 mL of THF was added and the solution filtered through alumina and precipitated into 500 mL of methanol. The solids were filtered and dried to give 524 mg of $PS_n$-PCL-$PS_m$ product with $M_n$=29,500 g/mol ($^1$H NMR; PS (total)=5.7 PCL). Mn=19,000 g/mol (GPC), PDI=1.34.

In the specification, there have been disclosed typical preferred embodiments of the invention, and although specific terms are employed, they are used in a generic and descriptive sense only, and not for the purposes of limitations. Similarly, the foregoing Examples are illustrative of the present invention and are not to be construed to be limiting thereof. The invention is defined by the following claims, with equivalents of the claims to be included therein.

That which is claimed is:

1. A method of forming a block copolymer, said method comprising:

reacting a substrate compound with a chain transfer agent in the presence of an alkali metal catalyst to form a telechelic oligomer, wherein the substrate compound is selected from the group consisting of polycarbonates, polyesters, polyurethanes, polyarylates, cyclic esters, cyclic carbonates, and cyclic urethanes; and reacting said telechelic oligomer with at least one additional compound selected from the group consisting of monomers of styrene, styrene derivatives, acrylate, methyl acrylate, methyl methacrylate, fluorinated acrylate, acrylonitrile, ethylene, butadiene, vinyl acetate, and vinyl chloride in a radical polymerization process, to produce a block copolymer.

2. A method of forming a block copolymer, said method comprising:

reacting a substrate compound with a chain transfer agent in the presence of an alkali metal catalyst to form a telechelic oligomer, wherein the substrate compound is selected from the group consisting of polycarbonates, polyesters, polyurethanes, polyarylates, cyclic esters, cyclic carbonates, and cyclic urethanes; and reacting said telechelic oligomer with at least one additional compound selected from the group consisting of monomers of styrene, styrene derivatives, acrylate, methyl acrylate, methyl methacrylate, acrylonitrile, ethylene, butadiene, vinyl acetate, and vinyl chloride in an living free radical polymerization process, to produce a block copolymer.

3. The method according to claim 2, wherein the living free radical polymerization process is selected from the group consisting of atom transfer free radical polymerization processes and nitroxide-mediated free radical polymerization processes.

4. A block copolymer PCL-PS-PMMA, said block copolymer having a polydispersity index of between about 1.0 and 10.0, inclusive, an average molecular weight ($M_n$) of PCL between about 1000 to 10000 g/mol, an average molecular weight ($M_n$) of PS is between about 1000 and 500,000 g/mol, inclusive, and an average molecular weight of PMMA between about 500 and 500,000 g/mol, inclusive.

5. A block copolymer produced by a method comprising:

reacting a substrate compound with a chain transfer agent in the presence of an alkali metal catalyst to form a telechelic oligomer, wherein the substrate compound is caprolactone; and reacting said telechelic oligomer with styrene and methyl methacrylate in an living free radical polymerization process, to produce a block copolymer;

wherein the living free radical polymerization process is selected from the group consisting of atom transfer free radical polymerization processes and nitroxide-mediated free radical polymerization processes;

and wherein said block copolymer is PCL-PS-PMMA with a polydispersity index of between about 1.0 and 10.0, inclusive, wherein the average molecular weight ($M_n$) of PCL is between about 1000 to 10000 g/mol;

the average molecular weight ($M_n$) of PS is between about 1000 and 500,000 g/mol, inclusive; and wherein the average molecular weight of PMMA is between about 500 and 500,000 g/mol, inclusive.

* * * * *

UNITED STATES PATENT AND TRADEMARK OFFICE
CERTIFICATE OF CORRECTION

PATENT NO. : 6,642,322 B2
DATED : November 4, 2003
INVENTOR(S) : Gagné et al.

It is certified that error appears in the above-identified patent and that said Letters Patent is hereby corrected as shown below:

Columns 5 and 6,
Scheme 1, should appear as follows:

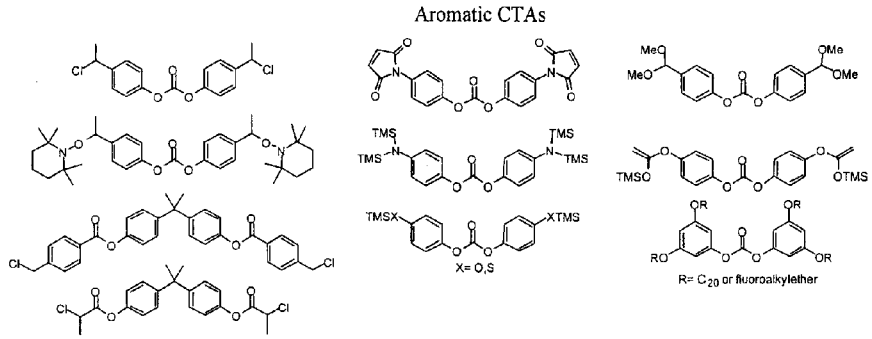

Columns 23 and 24,
Scheme 7, should appear as follows:

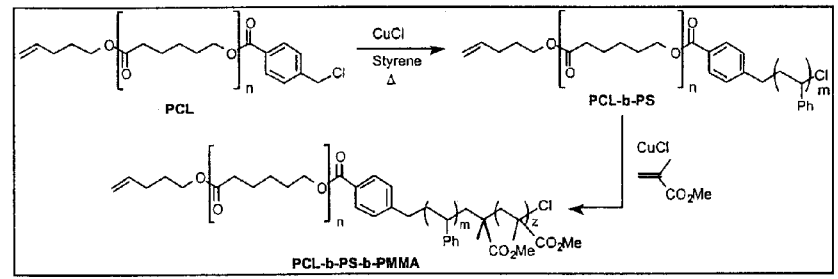

Signed and Sealed this

Sixteenth Day of March, 2004

JON W. DUDAS
*Acting Director of the United States Patent and Trademark Office*